(12) United States Patent
Ibrahim et al.

(10) Patent No.: US 11,233,550 B2
(45) Date of Patent: Jan. 25, 2022

(54) MULTI-USER PRECODERS BASED ON PARTIAL RECIPROCITY

(71) Applicant: Samsung Electronics Co., Ltd., Suwon-si (KR)

(72) Inventors: Ahmed Atef Ibrahim, Plano, TX (US); Yeqing Hu, Allen, TX (US); Young-Han Nam, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 16/802,373

(22) Filed: Feb. 26, 2020

(65) Prior Publication Data
US 2020/0304182 A1    Sep. 24, 2020

Related U.S. Application Data

(60) Provisional application No. 62/821,752, filed on Mar. 21, 2019, provisional application No. 62/821,708, (Continued)

(51) Int. Cl.
*H03D 3/18*      (2006.01)
*H04B 7/0456*    (2017.01)
(Continued)

(52) U.S. Cl.
CPC ......... *H04B 7/0456* (2013.01); *H04B 7/0417* (2013.01); *H04B 7/0452* (2013.01); *H04B 7/10* (2013.01)

(58) Field of Classification Search
CPC . H04L 27/1563; H04L 7/0334; H04B 7/0478; H04B 7/0456; H04B 17/24; H04B 7/0639; H04W 52/143; H04W 7/0413
(Continued)

(56) References Cited

U.S. PATENT DOCUMENTS 9,806,777 B1    10/2017    Doostnejad et al.
10,511,363 B2   12/2019    Ibrahim et al.
(Continued)

FOREIGN PATENT DOCUMENTS

WO    2018229078 A1    12/2018

OTHER PUBLICATIONS

International Search Report and Written Opinion of the International Searching Authority in connection with International Application No. PCT/KR2020/003868 dated Jun. 29, 2020, 9 pages.

*Primary Examiner* — Khai Tran

(57) ABSTRACT

A base station for generating multi-user precoders. The base station includes a transceiver configured to receive sounding reference signals (SRSs) from a set of user equipments (UEs), and a processor configured to select, for one or more UEs in the set of UEs, one or more codewords from an uplink codebook based on a correlation between the one or more codewords and the one or more SRSs; determine, using a composite downlink codebook, downlink codewords for the selected uplink codewords, respectively, the composite downlink codebook mapping uplink codewords to downlink codewords based on steering angles derived from the uplink codewords; transmit a set of pre-coded channel state information reference signals (CSI-RSs) to the one or more UEs, wherein the pre-coded CSI-RSs are pre-coded based on the determined downlink codewords; and identify a downlink channel matrix based on CSI feedback from the one or more UEs and the pre-coded CSI-RSs.

20 Claims, 8 Drawing Sheets

Related U.S. Application Data filed on Mar. 21, 2019, provisional application No. 62/835,145, filed on Apr. 17, 2019.

(51) Int. Cl.
*H04B 7/0417* (2017.01)
*H04B 7/10* (2017.01)
*H04B 7/0452* (2017.01)

(58) Field of Classification Search
USPC .......................................... 375/328, 260, 269
See application file for complete search history.

(56) References Cited

U.S. PATENT DOCUMENTS

| | | |
|---|---|---|
| 2016/0050006 A1 | 2/2016 | Ko et al. |
| 2017/0099090 A1 | 4/2017 | Liu et al. |
| 2017/0279514 A1 | 9/2017 | Rahman et al. |
| 2018/0302131 A1 | 10/2018 | Zhao et al. |
| 2019/0020388 A1* | 1/2019 | Lee ...................... H04B 7/0478 |
| 2019/0123799 A1* | 4/2019 | Kurras ................. H04B 7/0626 |
| 2020/0358494 A1* | 11/2020 | Tang ................... H04W 72/042 |

* cited by examiner

MULTI-USER PRECODERS BASED ON PARTIAL RECIPROCITY

CROSS-REFERENCE TO RELATED APPLICATION AND CLAIM OF PRIORITY

This application claims priority under 35 U.S.C. § 119(e) to U.S. Provisional Patent Application No. 62/821,752 filed on Mar. 21, 2019; to U.S. Provisional Patent Application No. 62/821,708 filed on Mar. 21, 2019; and to U.S. Provisional Patent Application No. 62/835,145 filed on Apr. 17, 2019. The above-identified provisional patent applications are hereby incorporated by reference in its entirety.

TECHNICAL FIELD

The present disclosure relates to a pre-5$^{th}$-Generation (5G) or 5G communication system to be provided for supporting higher data rates Beyond 4$^{th}$-Generation (4G) communication system such as Long-Term Evolution (LTE). More particularly, the present disclosure is directed to hybrid CSI acquisition for generating multi-user precoders for multi-user multi-input multi-output (MU-MIMO) antennas.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

Downlink (DL) massive MIMO (mMIMO) systems have mainly been implemented for time division duplex (TDD) bands, in which uplink (UL) & DL channel reciprocity holds. Exploiting channel reciprocity, DL channel state information (CSI) on the full DL band can be acquired at the base station (BS) using UL sounding reference signals (SRS) channel estimates. Relying on this full bandwidth DL CSI, frequency-selective multi-user MIMO (MU-MIMO) precoding can be performed. This frequency-selective precoding important to demonstrate the MU-MIMO performance gain over single-user MIMO (SU-MIMO). For frequency division duplex (FDD) bands, channel reciprocity does not hold in general. The channels in the UL BW are not the same as those in DL BW.

SUMMARY

Embodiments of the present disclosure include a base station, a method, and a computer-readable medium for generating multi-user precoders.

One embodiment is directed to a base station that includes a transceiver configured to receive one or more sounding reference signals (SRSs) from a set of user equipments (UEs), and a processor operably connected to the transceiver, which is configured to select, for one or more UEs in the set of UEs, one or more codewords from an uplink codebook based on a correlation between the one or more codewords and the one or more SRSs; determine, using a composite downlink codebook, downlink codewords for the selected uplink codewords, respectively, the composite downlink codebook mapping uplink codewords to downlink codewords based on steering angles derived from the uplink codewords; and transmit a set of pre-coded channel state information reference signals (CSI-RSs) to the one or more UEs. The pre-coded CSI-RSs are pre-coded based on the determined downlink codewords. The processor is also configured to identify a downlink channel matrix based on CSI feedback from the one or more UEs and the pre-coded CSI-RSs.

In another embodiment, a method for generating multi-user precoders is disclosed. The method includes receiving one or more sounding reference signals (SRSs) from a set of user equipments (UEs); selecting, for one or more UEs in the set of UEs, one or more codewords from an uplink codebook based on a correlation between the one or more codewords and the one or more SRSs; determining, using a composite downlink codebook, downlink codewords for the selected uplink codewords, respectively, the composite downlink codebook mapping uplink codewords to downlink codewords based on steering angles derived from the uplink codewords; and transmitting a set of pre-coded channel state information reference signals (CSI-RSs) to the one or more UEs. The pre-coded CSI-RSs are pre-coded based on the determined downlink codewords. The method also includes identifying a downlink channel matrix based on CSI feedback from the one or more UEs and the pre-coded CSI-RSs.

In yet another embodiment a non-transitory, computer-readable medium is disclosed. The non-transitory, computer-readable medium stores instructions that, when executed by a processor of a base station, cause the base station to receive one or more sounding reference signals (SRSs) from a set of user equipments (UEs); select, for one or more UEs in the set of UEs, one or more codewords from an uplink codebook based on a correlation between the one or more codewords and the one or more SRSs; determine, using a composite downlink codebook, downlink codewords for the selected uplink codewords, respectively, the composite downlink codebook mapping uplink codewords to downlink codewords based on steering angles derived from the uplink codewords; and transmit a set of pre-coded channel state information reference signals (CSI-RSs) to the one or more UEs. The pre-coded CSI-RSs are pre-coded based on the determined downlink codewords. The non-transitory, computer-readable medium also stores instructions that, when executed by a processor of a base station, cause the base station to identify a downlink channel matrix based on CSI feedback from the one or more UEs and the pre-coded CSI-RSs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
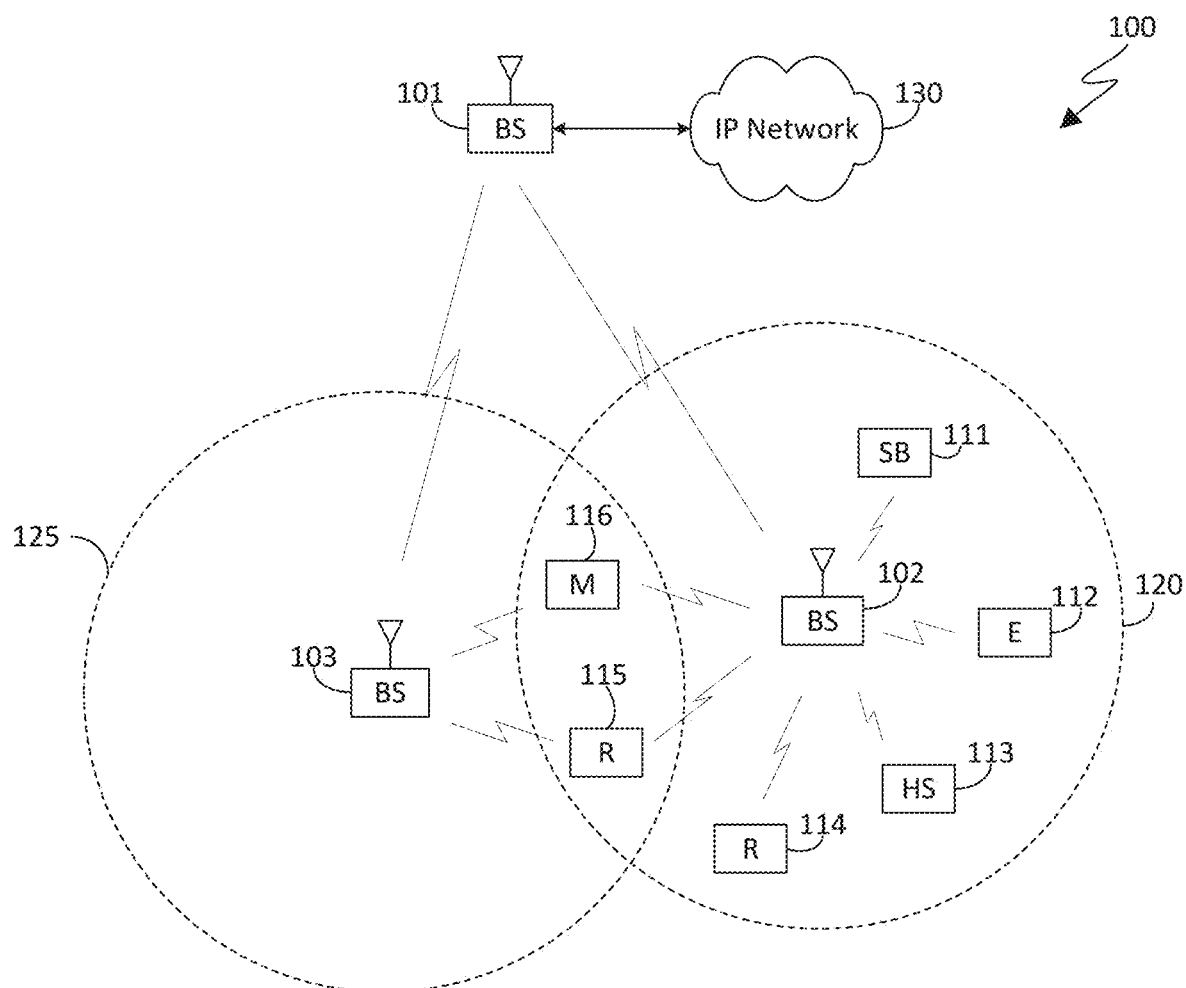
FIG. 1 illustrates an exemplary networked computing system according to various embodiments of this disclosure.

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

Novel aspects of this disclosure recognize that, although channel reciprocity does not hold in general for FDD bands, the channels in UL bandwidth and DL bandwidth are correlated. Especially when the duplex distance is small between the UL and the DL bands, the multi-path angles for the DL and the UL channels are likely to be at least similar, and the amplitude distribution for the multi-path angles is likely to be also similar. This UL/DL channel correlation may be referred to partial channel reciprocity. Accordingly, some embodiments of this disclosure involve determination of a domination direction of an UL channel, which can be used to determine the dominant direction of the DL channel. It could be possible to exploit this partial reciprocity to allow for FDD mMIMO to enable FDD MU-MIMO.

In some embodiments of this disclosure, a BS can generate multi-user precoders based on a hybrid mechanism by obtaining channel information on one dimension relying on channel reciprocity and obtaining information on the composite dimensions relying on the user equipment (UE) feedback and precoded pilot signals. A composite codebook can be the composition of codebooks representing the two dimensions of the channel. The composite codebook can associate UL codewords with DL codewords based on a corresponding steering angle. For example, the BS may transmit a pilot signal precoded based on a first precoding vector in a first time instance and receive corresponding CSI feedback (denoted as a first CSI feedback). The BS can transmit another pilot signal precoded based on a second precoding vector in a second time instance and receive corresponding CSI feedback (denoted as a second CSI feedback). The BS may utilize the two CSI feedback information and the first and the second precoding vectors to derive the full CSI for a UE.

Once the full CSI is derived for all the UEs, the BS may utilize the full CSI to derive MU-MIMO precoders, and transmit data signals on demodulation reference signal (DMRS) ports accordingly. Per UE CSI acquisition is based on a combination of multiple CSI feedback reports based on differently precoded pilots. Signals can be transmitted to multiple UEs on a same time-frequency resource by applying multi-user precoders on the modulation symbols.

In some embodiments, the multi-user precoders can be generated by a base station processing UE-specific SRS to obtain two or more beam weight vectors and corresponding beam weight amplitude values that best represent the UL channel matrices in the full UL bandwidth. In one or more of these embodiments that are described in more detail below, the base station constructs a subband DL CSI by taking a linear combination of the DL beam weight vectors. The coefficients are derived by computing the product between the corresponding amplitude values and the precoding vector corresponding to the subband PMI of the CSI report. The DL CSI can then be used by the base station to perform MU-MIMO scheduling and precoding, and DL transmissions.

FIG. 1 illustrates an exemplary networked computing system according to various embodiments of this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more base stations of the wireless network 100 can generate multi-user precoders based on the partial reciprocity. In particular, base stations can obtain some information regarding the multi-path responses from SRS relying on channel reciprocity; and can generate additional information regarding the multi-path responses relying on the UE feedback utilizing precoded pilot signals.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
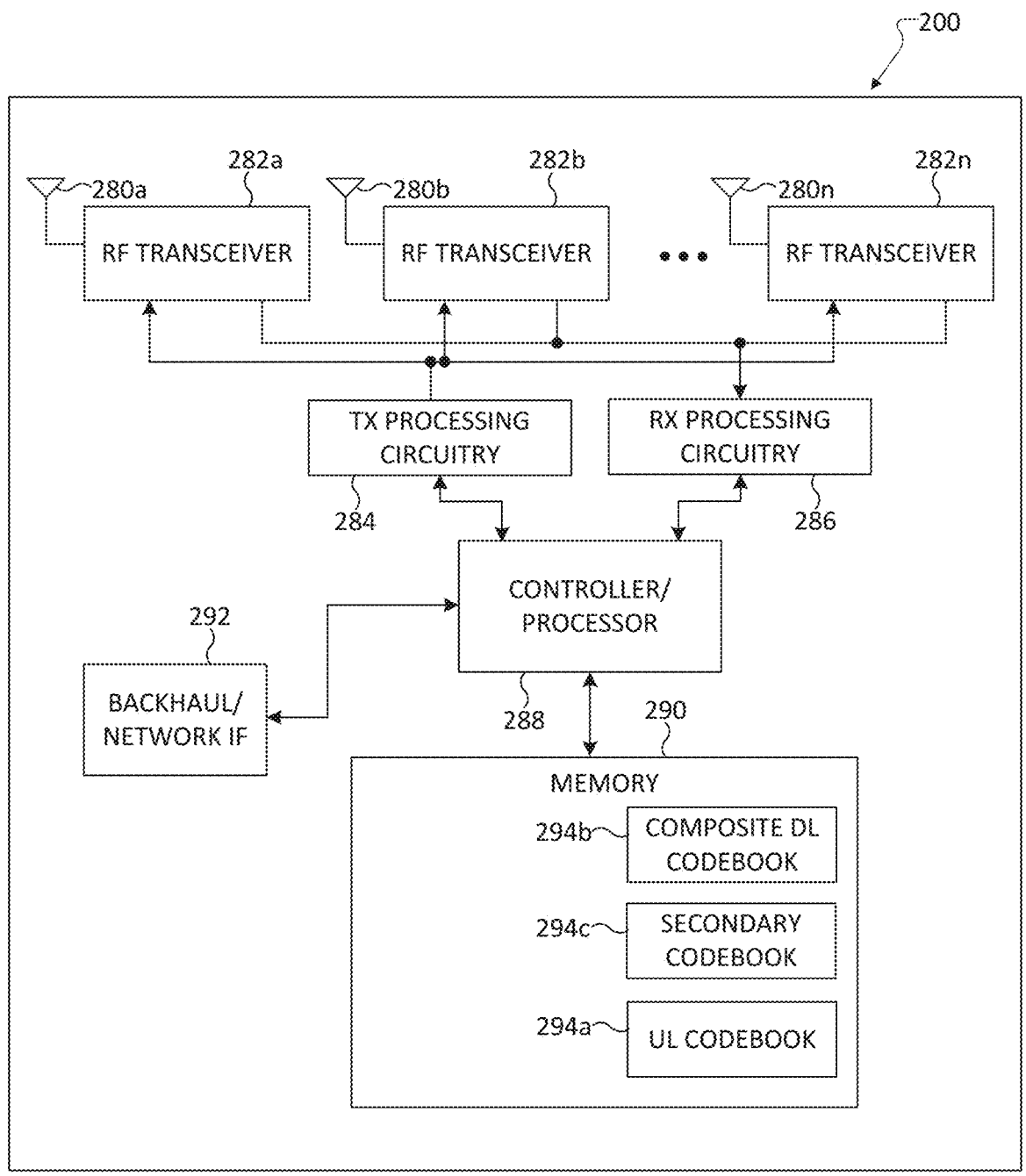
FIG. 2 illustrates an exemplary base station in the exemplary networked computing system according to various embodiments of this disclosure.

FIG. 2 illustrates an exemplary base station in the exemplary networked computing system according to various embodiments of this disclosure. Base station 200 can be a base station, such as base station 200 in FIG. 1. Further, the embodiment of the base station 200 illustrated in FIG. 2 is for illustration only and should not be deemed to limit the scope of this disclosure to any particular implementation of base station.

As shown in FIG. 2, the base station 200 includes multiple antennas 280a-280n, multiple RF transceivers 282a-282n, transmit (TX) processing circuitry 284, and receive (RX) processing circuitry 286. The base station 200 also includes a controller/processor 288, a memory 290, and a backhaul or network interface 292.

The RF transceivers 282a-282n receive, from the antennas 280a-280n, incoming RF signals, such as signals transmitted by UEs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the base station 200. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the base station 200 by the controller/processor 288. In some embodiments, the controller/processor 288 includes at least one microprocessor or microcontroller.

The controller/processor 288 is also capable of executing programs, instructions, and other processes resident in the memory 290, such as a basic OS. The controller/processor 288 can move data into or out of the memory 290 as required by an executing process. In one embodiment, memory 290 stores a set of codebooks usable for generating multi-user precoders. For example, memory 290 can store an UL codebook 294a, a composite DL codebook 294b, and a secondary codebook 294c. The UL codebook 294a is a codebook generated based on the antenna configuration and number of beams. The composite DL codebook 294b is a codebook formed in part based on the UL codewords in the UL codebook 294a and DL codewords associated with UL codewords by steering angles. An example of composite codebook 294b is shown in Table 1 below.

TABLE 1

| Codeword Index from UL Codebook | Steering Angle | UL Codeword | DL Codeword |
|---|---|---|---|
| 1 | $\theta_1$ | UL Codeword 1 | DL Codeword 1 |
| 2 | $\theta_2$ | UL Codeword 2 | DL Codeword 2 |
| 3 | $\theta_3$ | UL Codeword 3 | DL Codeword 3 |
| ... | ... | ... | ... |
| N | $\theta_N$ | UL Codeword N | DL Codeword N |

The secondary codebook 294c is a codebook storing all the codewords used by UEs attached to the base station 200, which allows the BS to identify the most used codewords by UEs. The secondary codebook 294c is larger, i.e., includes a greater number of codewords, than the UL codebook 294a.

In certain embodiments, controller/processor 288 can include a parallel processing unit configured to maintain the secondary codebook 294c and update the UL codebook 294a with N of the most used codewords from the secondary codebook 294c. In one embodiment, the UL codebook 294a is updated with five of the most used codewords from the secondary codebook 294c.

The controller/processor 288 is also coupled to the backhaul or network interface 292. The backhaul or network interface 292 allows the base station 200 to communicate with other devices or systems over a backhaul connection or over a network. The interface 292 could support communications over any suitable wired or wireless connection(s). For example, when the base station 200 is implemented as part of a cellular communication system (such as one supporting 5G, LTE, or LTE-A), the interface 292 could allow the base station 200 to communicate with other base stations over a wired or wireless backhaul connection. When the base station 200 is implemented as an access point, the interface 292 could allow the base station 200 to communicate over a wired or wireless local area network or over a wired or wireless connection to a larger network (such as the Internet). The interface 292 includes any suitable structure supporting communications over a wired or wireless connection, such as an Ethernet or RF transceiver.

The memory 290 is coupled to the controller/processor 288. Part of the memory 290 could include a RAM, and another part of the memory 290 could include a Flash memory or other ROM.

Although FIG. 2 illustrates an example of a device in a computing system, various changes may be made to FIG. 2. For example, various components in FIG. 2 could be combined, further subdivided, or omitted and additional components could be added according to particular needs. In addition, as with computing and communication networks, client devices and servers can come in a wide variety of configurations, and FIG. 2 does not limit this disclosure to any particular base station. Further, the base station 200 in can implement MIMO technologies and take the form of an MMU depicted in FIG. 3 that follows.

Figure 3:
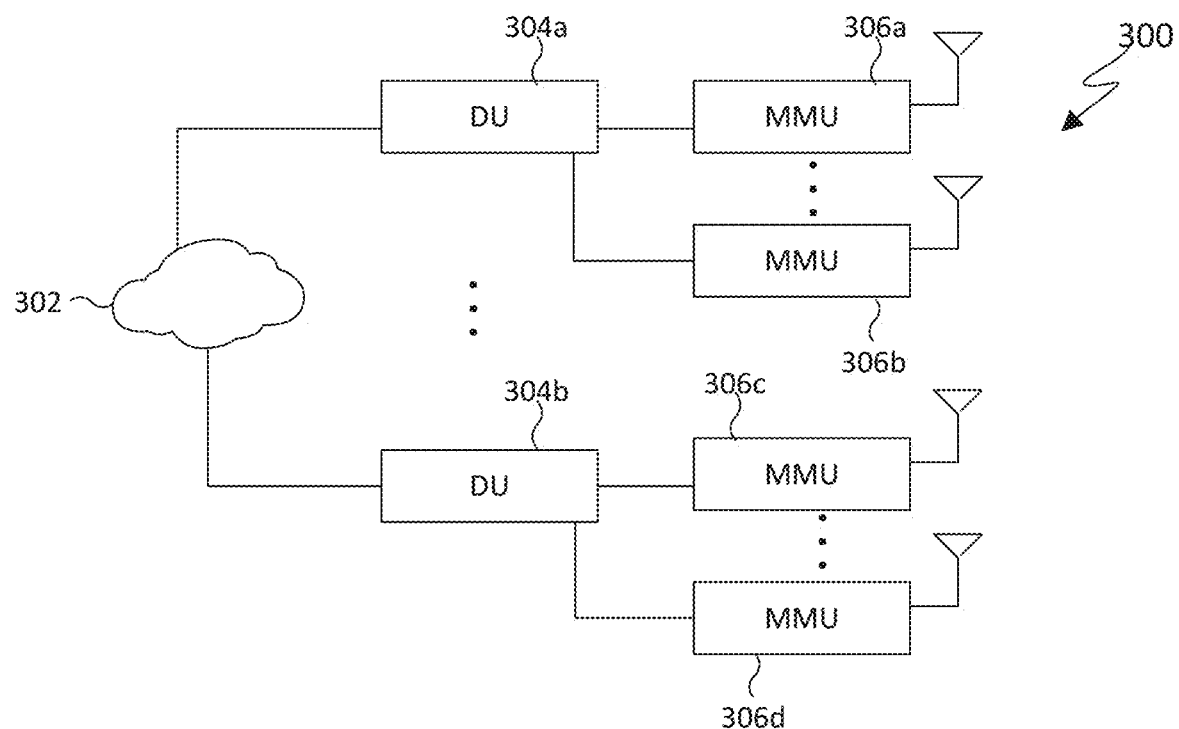
FIG. 3 illustrates an exemplary network architecture for multi-user, massive multi-input, multi-output (MU-MIMO) communication according to various embodiments of this disclosure.

FIG. 3 illustrates an exemplary network architecture for MU-MIMO communication according to various embodiments of this disclosure. The network architecture 300 can be included in the network 100 in FIG. 1. For example, network 302 may be a part of network 130 in FIG. 1 supporting communication by data units 304a and 304b.

In this non-limiting embodiment, data units 304a and 304b are electronic devices that interface backhaul to an IP network, each of which can support one or more multiple massive MIMO (multi-input-multi-output) units (MMUs) MMUs 306a-3063d. The data units 304a and 304b can be equipped with at least one of modems, digital signal processors (DSPs), FPGAs (field programmable gate arrays), and memory units. The data units 304a and 304b can processes information bits to generate intermediate signals that can be passed to the MMUs 306a-306d for conversion into radio signals. The radio signals can then be transmitted via massive MIMO antennas. In some embodiments, MMUs 306a-306d may have processing power, in which case the MMUs 306a-306d include modems, DSPs, FPGAs, and memory units, in addition to RF (radio frequency) hardware and massive MIMO antennas.

Figure 4:
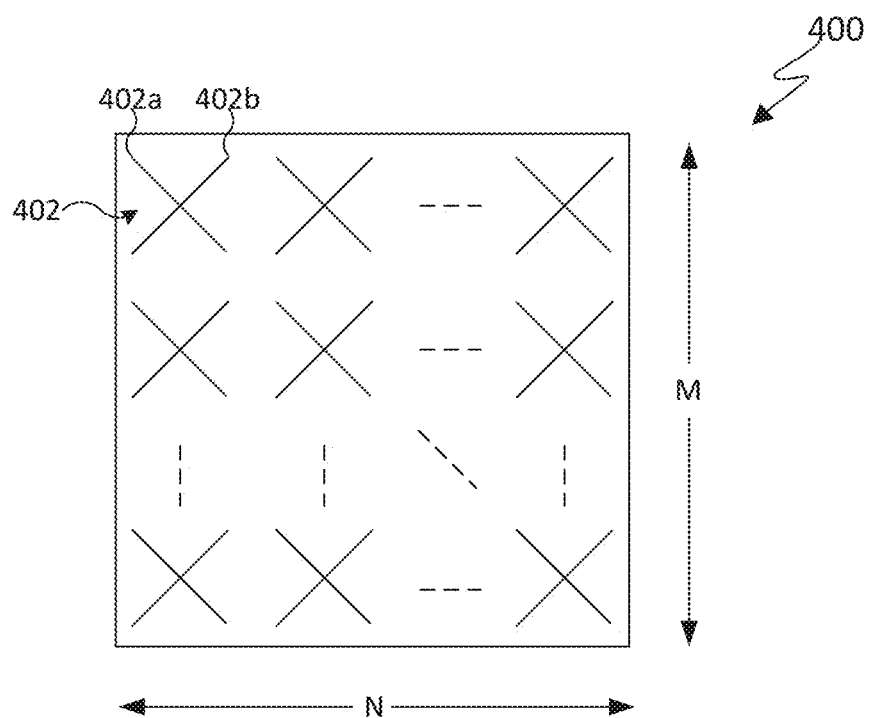
FIG. 4 illustrates an exemplary antenna for MU-MIMO communication according to various embodiments of this disclosure.

FIG. 4 illustrates an exemplary antenna for MU-MIMO communication according to various embodiments of this disclosure. The antenna 400 can be attached to MMUs, such as MMUs 306a-306d in FIG. 3 for enabling communication with one or more UEs in a set of UEs.

The antenna 400 can be a FD-MIMO or mMIMO antenna panel on which X-pol antenna element pairs 402 are placed in two dimensions and arranged in M rows and N columns with antenna spacing of ($d_V$, $d_H$). Each X-pol element pair 402 comprises two antennas 402a and 402b polarized into two directions, e.g., +45 degs and −45 degs. As used herein, an antenna element pair may also be referred to in the alternative as a transceiver unit (TXRU).

With reference to antenna 400, the following definitions are provided:

$[x_m]_{m=0, \ldots, M-1}$ refers to a vector of length M and equals to $[x_m]_{m=0, \ldots, M-1} = [x_0, x_1, \ldots, x_{M-1}]$.

$w^x$ implies the elementwise power to the x. For example, $w^x = [w_1 \ w_2]^x = [w_1^x \ w_2^x]$.

The total number of TXRUs is denoted as $N_{TXRU} = MN$.

The UL and DL wavelengths are denoted as: $\lambda_{UL}$ and $\lambda_{DL}$; and the corresponding center frequencies are: $f_{UL}$ and $f_{DL}$.

Figure 5:
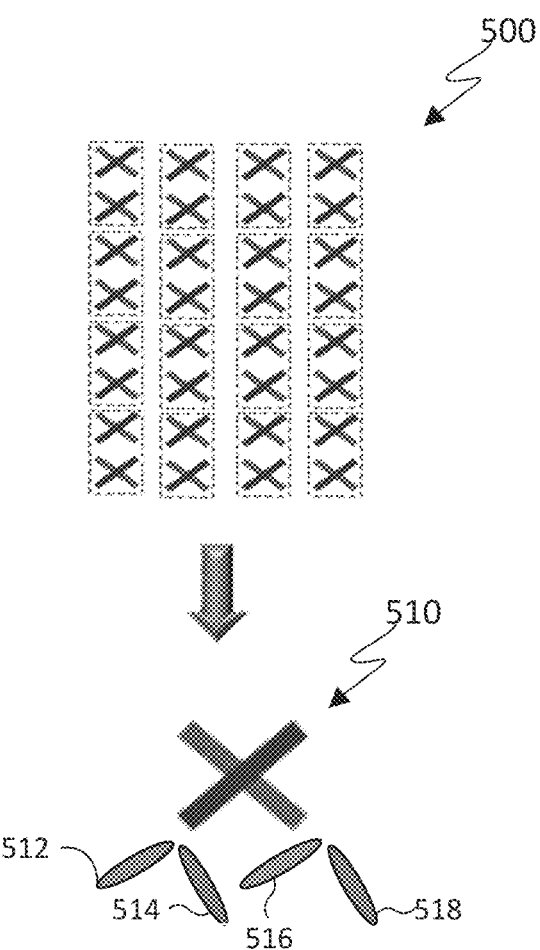
FIG. 5 illustrates virtualization of TXRUs of an antenna according to various embodiments of this disclosure.

FIG. 5 illustrates virtualization of TXRUs of an antenna according to various embodiments of this disclosure. The antenna 500 is an antenna such as antenna 400 in FIG. 4.

TXRUs of antenna 500 can be virtualized into virtual antenna 510 using two three-dimensional (3-D) beams divided into four CSI-RS ports 512, 524, 516, and 518. In a non-limiting embodiment, CSI-RS port 512 corresponds to port 0: pol 1, beam 1; CSI-RS port 514 corresponds to port 2: pol 1, beam 2; CSI-RS port 516 corresponds to port 1: pol 2, beam 1; and CSI-RS port 518 corresponds to port 3: pol 2, beam 2.

Figure 6:
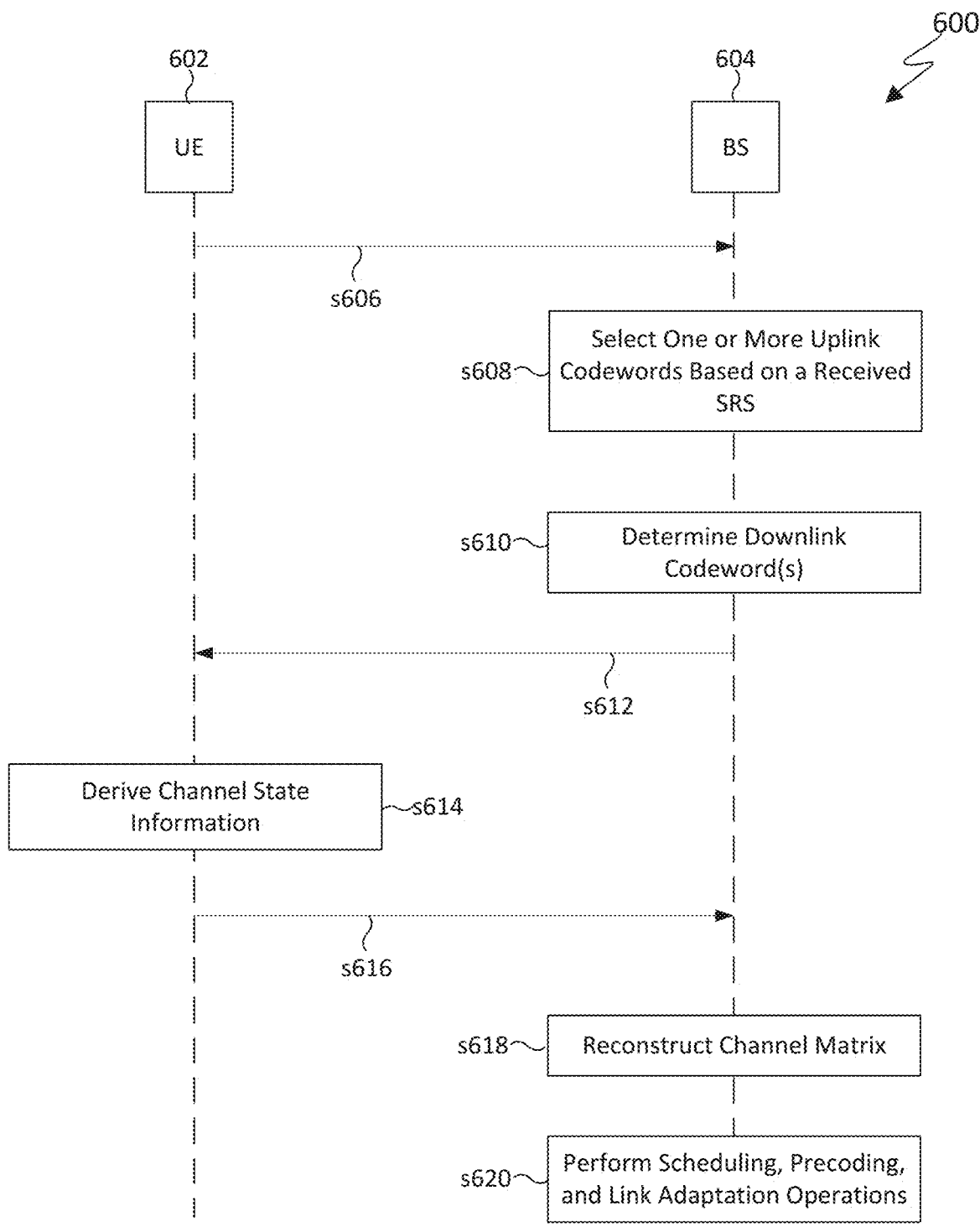
FIG. 6 illustrates a signal flow diagram between a user equipment (UE) and a base station (BS) according to various embodiments of this disclosure.

FIG. 6 illustrates a signal flow diagram between a user equipment (UE) and a base station (BS) according to various embodiments of this disclosure. The signal flow diagram 600 depicts signal flow between a UE and a BS in a networked computing system, such UE 112 and BS 102 in network 100 in FIG. 1.

Signal flow diagram 600 will be described for a first embodiment where a BS determines CSI based on a single beam. Signal flow diagram 600 will then be described for a second embodiment where the BS determines CSI based on a plurality of beams using linear combination.

In s606, UE 602 transmits a sounding reference signal (SRS) to BS 604. The SRS is an UL reference signal usable by BS 604 to estimate the UL channel quality.

At s608, the BS 604 selects a one or more UL codewords based on the SRS received from the UE 602. In one embodiment, the one or more UL codewords are selected based on correlation values computed between the received SRS and UL codewords in an UL codebook. Each of the UL codewords in the UL codebook defines a UL beam. Restated, each of the UL codewords in UL codebook can be used to produce an UL beam from the UE 602 to the BS 604. In one embodiment, the UL codebook is an oversampled discrete Fourier transform (OSDFT) codebook generated based on dimensions and number of beams of an antenna panel, such as antenna panel 400 in FIG. 4.

In some embodiments, the UL codebook can be generated by calculating oversampled DFT beamforming weights for the azimuth ($w_H^{UL}$) and/or elevation ($w_V^{UL}$) dimensions using oversampling factors $O_M$ and $O_N$, respectively, as shown below:

$$w_V^{UL} = \left\{ \left[ \frac{1}{\sqrt{N_{TXRU}}} \exp\left(-\frac{j2\pi m k_V}{O_M M}\right) \right]_{m=0,\ldots,M-1} \right.$$

$$\left. k_V \in \{0, 1, \ldots, O_M M - 1\} \right\}; \text{ and}$$

$$w_H^{UL} = \left\{ \left[ \frac{1}{\sqrt{N_{TXRU}}} \exp\left(-\frac{j2\pi n k_H}{O_N N}\right) \right]_{n=0,\ldots,N-1} \right.$$

$$\left. k_H \in \{0, 1, \ldots, O_N N - 1\} \right\}.$$

In one embodiment, when one UL codeword is selected in s608, the BS determines a DL codeword in s610 based on the selected UL codeword. A DL codeword defines a DL beam (i.e., the DL codeword can be used to produce a DL beam from the BS 604 to the UE 602). Determination of a DL codeword based on the selected UL codeword may be referred to in the alternative as "frequency translation". A more detailed flowchart describing frequency translation is provided in FIG. 7 that follows.

In s612 the BS 604 transmits a beamformed channel state information reference signal (CSI-RS) on the transceiver units (TXRUs) of an antenna array to the UE 602. Beamforming weights are applied to the CSI-RS based on the determined DL codeword from s610.

In some embodiments, the beamforming weights (i.e., beam weight vectors) for the CSI-RS are applied to both dimensions (i.e., azimuth and elevation). For example, CSI-RS beams can be constructed narrowly in both azimuth and elevation dimensions. The narrow CSI-RS beam along a dimension is constructed by applying beamforming weights over the antenna elements (i.e., TXRUs) of the 2D antenna array/panel. The beamforming weights can be applied across all the antenna elements of the 2D antenna panel. In this case, the UL beam weight vector can be denoted as $w^{UL} = w_H^{UL} \otimes w_V^{UL}$; and the DL beam weight vector can be denoted as $w^{DL} = w_H^{DL} \otimes w_V^{DL}$, where $\otimes$ denotes Kronecker product.

In cases where the beam weight vectors steer the beam into a pair of azimuth and elevation angles ($\phi$, $\theta$), the UL and the DL beam weight vectors can be denoted as $w^{UL} = w_H^{UL}(\phi) \otimes w_V^{UL}(\theta)$ and $w^{DL} = w_H^{DL}(\phi) \otimes w_V^{DL}(\theta)$, respectively.

In some embodiments, the beamforming weights for the CSI-RS are applied to a single dimension (i.e., 1D steering). For example, CSI-RS beams are constructed narrow in either azimuth or elevation dimension, and wide in the other dimension. The narrow CSI-RS beam along one of the dimensions is constructed by applying beamforming weights across the antenna elements in each column or each row of the 2D antenna array, i.e., $w^{UL} = w_H^{UL}(\phi)$ to steer the beam to an azimuth angle $\phi$, and $w^{UL} = w_V^{UL}(\theta)$ to steer the beam to an elevation angle $\theta$. The frequency translation to the DL codewords can be similarly conducted similarly as the 2D steering case described in more detail that follows.

In s614, the UE 602 derives CSI information and provides CSI feedback in s616. The CSI feedback can include a pre-coding matrix indicator, a channel quality indicator, and a rank indicator. In some embodiments, the UE is configured to operate according to transmission mode 9.

In s618, the BS 604 reconstructs the channel matrix for the UE 602 based on the CSI feedback and the DL beamforming weights. Thereafter, the BS 604 can use the reconstructed channel matrix for performing scheduling, precoding, and link adaptation operations.

Figure 7:
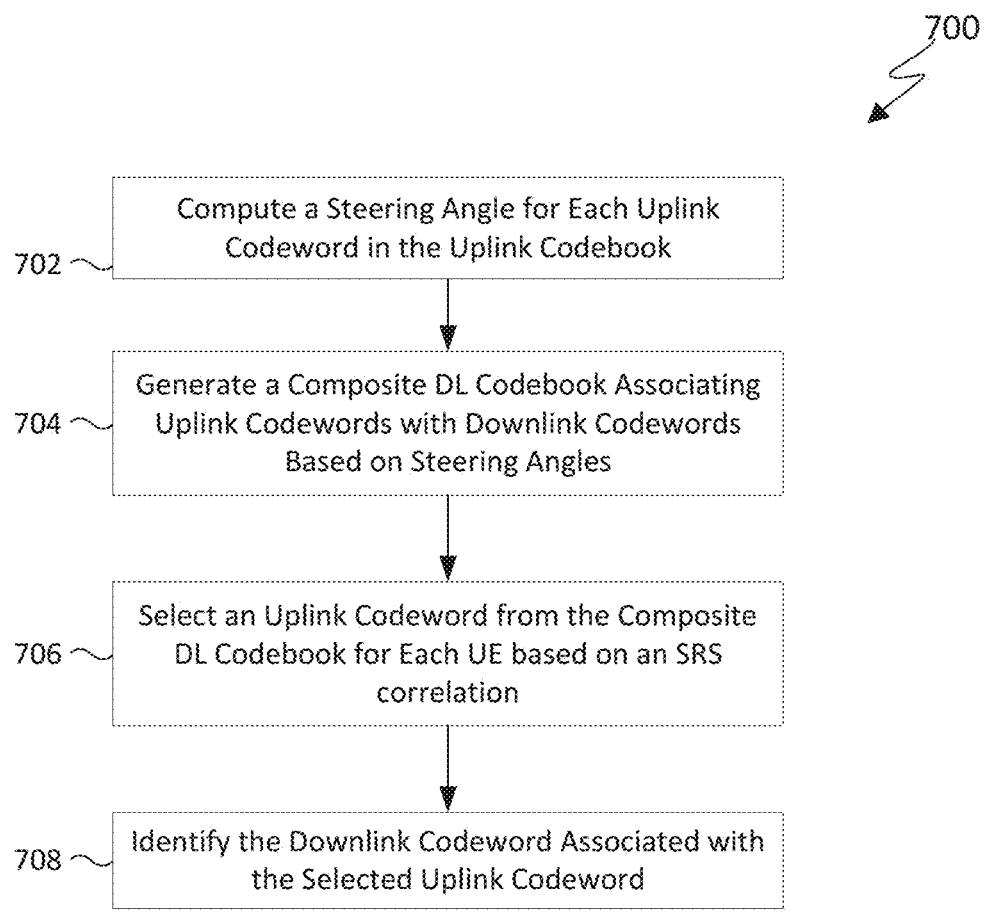
FIG. 7 illustrates a flowchart for determining downlink codewords according to various embodiments of this disclosure.

FIG. 7 illustrates a flowchart for determining downlink codewords according to various embodiments of this disclosure. Operations in flowchart 700 can be carried out by a base station such as base station 200 in FIG. 2.

In one embodiment, flowchart 700 begins at operation 702 by computing a steering angle for each UL codeword in the UL codebook. As previously mentioned, the UL codebook is a codebook generated based on dimensions and number of beams of an antenna panel of a BS, such as antenna panel 400 in FIG. 4.

In a nonlimiting embodiment, assuming an omni-directional antenna, computation of the steering angle for each UL codeword involves calculating all associated angles including grating lobes. For example, an omni-array of N transceiver units, i.e., $N_{TXRU}$, forms a beam pointing to elevation angle $\theta$, at carrier wavelength $\lambda$, with a beamforming weight ($w_v$) as shown in the following equation:

$$w_v = \left\{ \left[ \frac{1}{\sqrt{N_{TXRU}}} \exp\left(-\frac{j2\pi m d_V \cos(\theta)}{\lambda}\right) \right]_{m=0,\ldots,M-1} \right\}.$$

Considering an oversampled DFT codeword from the UL codebook, e.g., the $k^{th}$ codeword, the beamforming weight ($w_v$) is:

$$w_v = \left\{ \left[ \frac{1}{\sqrt{N_{TXRU}}} \exp\left(-\frac{j2\pi mk}{O_M M}\right) \right]_{m=0,\ldots,M-1} \right\}.$$

The mapping from the k-th codeword to all the steering angles, including grating lobes, is computed by:

$$\theta = \cos^{-1}\left( a\frac{\lambda}{d_v} + \frac{k}{O_M M}\frac{\lambda}{d_v} \right),$$

where $a = 0, \pm 1, \pm 2 \ldots$

The grating lobes will happen when $d_v > 0.5\lambda$.

Similarly, for a horizontal codebook and steering angle, the mapping can be computing by:

$$\phi = \sin^{-1}\left( a\frac{\lambda}{d_h} + \frac{k}{O_N N}\frac{\lambda}{d_h} \right).$$

In some embodiments, multiple aliasing angles can correspond to one UL codeword. The steering angle can be selected from the multiple aliasing angles by computing the array response of each of the multiple aliasing angles (considering potential subarray virtualization and element pattern). The steering angle can be selected based on the angle that yields maximum response, as can be seen in the discussion that accompanies FIG. 8.

In operation 704, a composite codebook is generated which associates UL codewords with DL codewords based on a corresponding steering angle. In one embodiment, the composite codebook is generated by calculating DL codewords based on the steering angles (e.g., $\theta_m^{UL}$ and $\phi_m^{UL}$) calculated from the UL codeword. For example, DL beamforming weights can be calculated for azimuth ($w_H^{DL}$) and elevation ($W_v^{DL}$) using the following equations:

$$w_v^{DL}(\theta_{UL}) = \left[ \frac{1}{\sqrt{N_{TXRU}}} \exp\left(-\frac{j2\pi m d_V \cos(\theta_m^{UL})}{\lambda_{DL}}\right) \right]_{m=0,\ldots,M-1} ; \text{ and}$$

$$w_H^{DL}(\phi_{UL}) = \left[ \frac{1}{\sqrt{N_{TXRU}}} \exp\left(-\frac{j2\pi n d_H \sin(\phi_m^{UL})}{\lambda_{DL}}\right) \right]_{n=0,\ldots,N-1}.$$

A portion of the resulting composite codebook is shown in Table 2. Steering angles of Table 2 are based on the uplink codebook and the uplink frequency.

TABLE 2

| UL CWs used for correlation with SRS | Steering Angle | DL codewords |
|---|---|---|
| $\left[ \frac{1}{\sqrt{N_{TXRU}}} \exp\left(-\frac{j2\pi m * 0}{O_M M}\right) \right]_{m=0,\ldots,M-1}$ | $\theta_0^{UL}$ | $\left[ \frac{1}{\sqrt{N_{TXRU}}} \exp\left(-\frac{j2\pi m d_V \cos(\theta_0^{UL})}{\lambda_{DL}}\right) \right]_{m=0,\ldots,M-1}$ |
| $\left[ \frac{1}{\sqrt{N_{TXRU}}} \exp\left(-\frac{j2\pi m * 1}{O_M M}\right) \right]_{m=0,\ldots,M-1}$ | $\theta_1^{UL}$ | $\left[ \frac{1}{\sqrt{N_{TXRU}}} \exp\left(-\frac{j2\pi m d_V \cos(\theta_1^{UL})}{\lambda_{DL}}\right) \right]_{m=0,\ldots,M-1}$ |
| ... | ... | ... |
| $\left[ \frac{1}{\sqrt{N_{TXRU}}} \exp\left(-\frac{j2\pi m * O_M M - 1}{O_M M}\right) \right]_{m=0,\ldots,M-1}$ | $\theta_{O_M M-1}^{UL}$ | $\left[ \frac{1}{\sqrt{N_{TXRU}}} \exp\left(-\frac{j2\pi m d_V \cos(\theta_{O_M M-1}^{UL})}{\lambda_{DL}}\right) \right]_{m=0,\ldots,M-1}$ |
| $\left[ \frac{1}{\sqrt{N_{TXRU}}} \exp\left(-\frac{j2\pi n * 0}{O_N N}\right) \right]_{n=0,\ldots,N-1}$ | $\phi_0^{UL}$ | $\left[ \frac{1}{\sqrt{N_{TXRU}}} \exp\left(-\frac{j2\pi n d_H \sin(\phi_0^{UL})}{\lambda_{DL}}\right) \right]_{n=0,\ldots,N-1}$ |
| $\left[ \frac{1}{\sqrt{N_{TXRU}}} \exp\left(-\frac{j2\pi n * 1}{O_N N}\right) \right]_{n=0,\ldots,N-1}$ | $\phi_1^{UL}$ | $\left[ \frac{1}{\sqrt{N_{TXRU}}} \exp\left(-\frac{j2\pi n d_H \sin(\phi_1^{UL})}{\lambda_{DL}}\right) \right]_{n=0,\ldots,N-1}$ |
| ... | ... | ... |
| $\left[ \frac{1}{\sqrt{N_{TXRU}}} \exp\left(-\frac{j2\pi n * O_N N - 1}{O_N N}\right) \right]_{n=0,\ldots,N-1}$ | $\phi_{O_N N-1}^{UL}$ | $\left[ \frac{1}{\sqrt{N_{TXRU}}} \exp\left(-\frac{j2\pi n d_H \sin(\phi_{O_N N-1}^{UL})}{\lambda_{DL}}\right) \right]_{n=0,\ldots,N-1}$ |

In another embodiment, the oversampled DFT codewords directions can be determined first based on the DL channel by generating a set of DL angles $\{\theta_0^{DL}, \theta_1^{DL}, \ldots, \theta_{O_M M-1}^{DL}\}$ and/or $\{\phi_0^{DL}, \phi_1^{DL}, \ldots, \phi_{O_N N-1}^{DL}\}$, which provides a set of angles corresponding to the steering effect each codeword has on the DL channel. The set of angles can then be used to generate the composite codebook as previously described. A portion of the resulting composite codebook is shown in Table 3. The steering angles are based on an oversampled DFT codebook and DL frequency.

TABLE 3

| Steering Angle | UL codewords used for correlation with SRS | DL codewords corresponding to each of the UL codewords |
|---|---|---|
| $\theta_0^{DL}$ | $\left[\frac{1}{\sqrt{N_{TXRU}}}\exp\left(-\frac{j2\pi md_V \cos(\theta_0^{DL})}{\lambda_{UL}}\right)\right]_{m=0,\ldots,M-1}$ | $\left[\frac{1}{\sqrt{N_{TXRU}}}\exp\left(-\frac{j2\pi md_V \cos(\theta_0^{DL})}{\lambda_{DL}}\right)\right]_{m=0,\ldots,M-1}$ |
| $\theta_1^{DL}$ | $\left[\frac{1}{\sqrt{N_{TXRU}}}\exp\left(-\frac{j2\pi md_V \cos(\theta_1^{DL})}{\lambda_{UL}}\right)\right]_{m=0,\ldots,M-1}$ | $\left[\frac{1}{\sqrt{N_{TXRU}}}\exp\left(-\frac{j2\pi md_V \cos(\theta_1^{DL})}{\lambda_{DL}}\right)\right]_{m=0,\ldots,M-1}$ |
| $\vdots$ | $\vdots$ | $\vdots$ |
| $\theta_{O_M M-1}^{DL}$ | $\left[\frac{1}{\sqrt{N_{TXRU}}}\exp\left(-\frac{j2\pi md_V \cos(\theta_{O_M M-1}^{DL})}{\lambda_{UL}}\right)\right]_{m=0,\ldots,M-1}$ | $\left[\frac{1}{\sqrt{N_{TXRU}}}\exp\left(-\frac{j2\pi md_V \cos(\theta_{O_M M-1}^{DL})}{\lambda_{DL}}\right)\right]_{m=0,\ldots,M-1}$ |
| $\phi_0^{DL}$ | $\left[\frac{1}{\sqrt{N_{TXRU}}}\exp\left(-\frac{j2\pi nd_H \sin(\phi_0^{DL})}{\lambda_{UL}}\right)\right]_{n=0,\ldots,N-1}$ | $\left[\frac{1}{\sqrt{N_{TXRU}}}\exp\left(-\frac{j2\pi nd_H \sin(\phi_0^{DL})}{\lambda_{DL}}\right)\right]_{n=0,\ldots,N-1}$ |
| $\phi_1^{DL}$ | $\left[\frac{1}{\sqrt{N_{TXRU}}}\exp\left(-\frac{j2\pi nd_H \sin(\phi_1^{DL})}{\lambda_{UL}}\right)\right]_{n=0,\ldots,N-1}$ | $\left[\frac{1}{\sqrt{N_{TXRU}}}\exp\left(-\frac{j2\pi nd_H \sin(\phi_1^{DL})}{\lambda_{DL}}\right)\right]_{n=0,\ldots,N-1}$ |
| $\vdots$ | $\vdots$ | $\vdots$ |
| $\phi_{O_N N-1}^{DL}$ | $\left[\frac{1}{\sqrt{N_{TXRU}}}\exp\left(-\frac{j2\pi nd_H \sin(\phi_{O_N N-1}^{DL})}{\lambda_{UL}}\right)\right]_{n=0,\ldots,N-1}$ | $\left[\frac{1}{\sqrt{N_{TXRU}}}\exp\left(-\frac{j2\pi nd_H \sin(\phi_{O_N N-1}^{DL})}{\lambda_{DL}}\right)\right]_{n=0,\ldots,N-1}$ |

In operation 706, an UL codeword is selected from the composite DL codebook based on the SRS correlation. UL codewords can be selected for each UE that transmitted an SRS to the BS. In operation 708, the DL codeword associated with the UL codeword is identified. The DL codeword can be used to send the beamformed CSI-RS to a UE that send the corresponding SRS.

Figure 8:
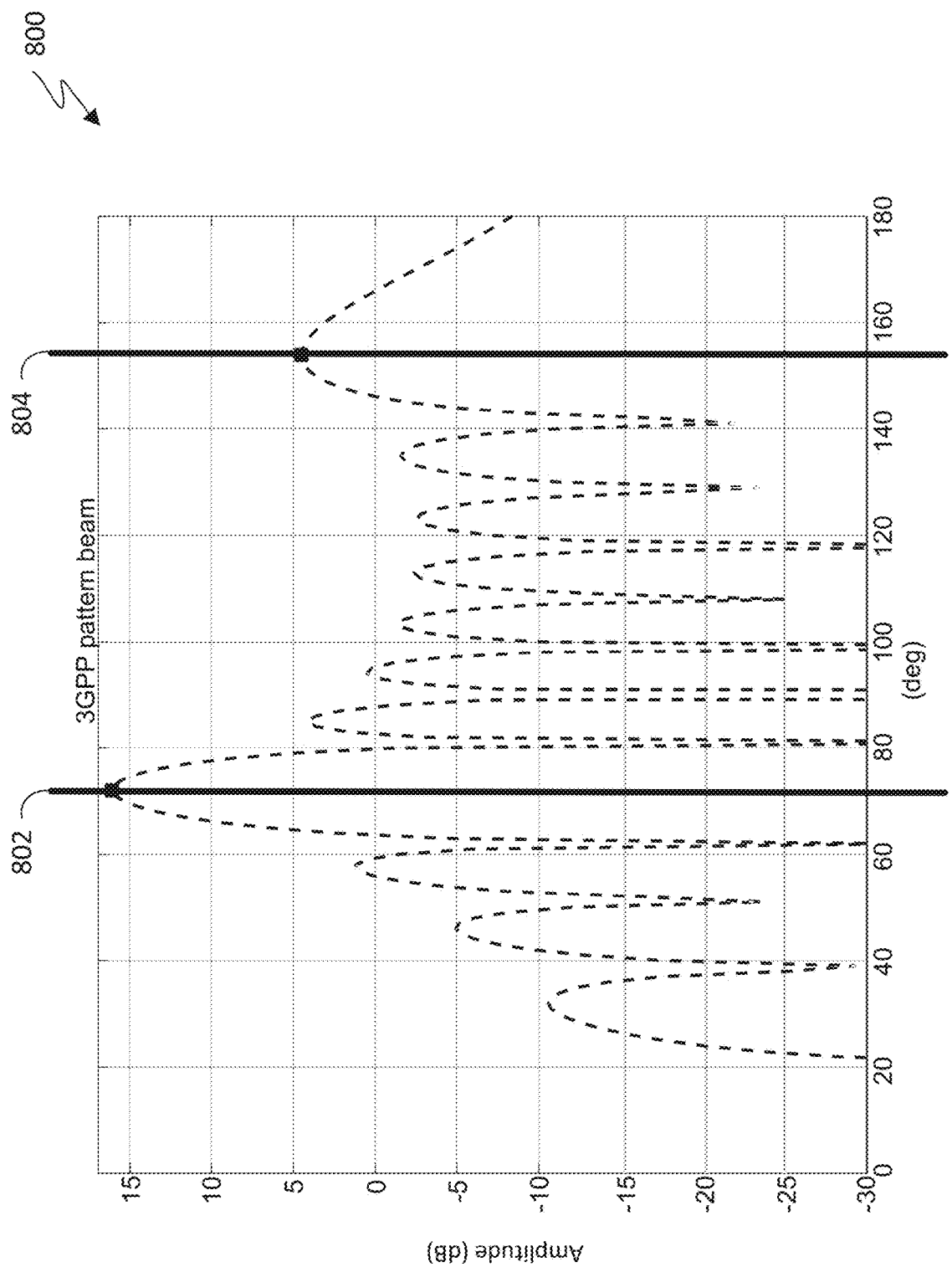
FIG. 8 illustrates an exemplary array response for an uplink codeword having more than one corresponding angle according to various embodiments of this disclosure.

FIG. 8 illustrates an exemplary array response for an uplink codeword having more than one corresponding steering angle according to various embodiments of this disclosure. Among the corresponding steering angles, one or more may have a low array response amplitude due to the element pattern/subarray virtualization of the antenna array. For example, depicted curve depicted in chart 800 shows a first angle 802 at about 72° and a second angle 804 at about 154° when the steering angles are calculated in accordance with operation 702 in flowchart 700. Because the second angle 804 has a smaller array response, the first angle 802 is selected as the steering angle for the associated UL codeword.

The number of DL codewords usable by a base station for transmitting CSI-RS beams can be limited due to a number of factors, at least some of which includes overhead and compatibility limitations. The larger the number of beams available for CSI-RS precoding yields better performance. The benefit of having a large number of beams while still limiting the number of beams that are actually used for CSI-RS precoding to a smaller number can be realized by a time-varying CSI-RS beamset. Thus, in certain embodiments a parallel processing unit can be implemented that receives SRS from each UE at each reporting TTI and uses a finer beamset (i.e., a beamset that has a large number of beams) to decide which is the best beam to be used for each UE. This finer beamset can be maintained in a codebook, such as secondary codebook 294c in FIG. 2. In another embodiment, the time varying beamset may be maintained in a separate codebook stored in memory 290 of BS 200 in FIG. 2.

The finer beamset is not used for CSI-RS precoding. Instead, a separate processing unit decides the beam that precodes CSI-RS based on SRS and using a time-varying beamset that has a small number of beams. However, this small number of beams is not fixed. These beams change with time. The parallel processing unit runs a learning algorithm on the stored beam decisions in the past TTIs and choses only a subset of the large number of beams to update the CSI-RS precoder. This may happen every T>>SRS reporting frequency.

Linear Combination

In the initial discussion of FIG. 6, operations of signal flow diagram 600 were described relative to an embodiment in which a single codeword is selected in s608 for each UE in the set of UEs. Thus, CSI in the first embodiment is determined based on a single beam. In the discussion of FIG. 6 that follows, more than one codeword is selected for each UE in the set of UEs so that CSI can be based on a plurality of beams. In particular, the CSI can be obtained by taking a linear combination of a L orthogonal beams, where L is an integer greater than 1.

With reference to s608 in signal flow diagram 600, the BS 604 can select L UL codewords based on an SRS received from the UE 602. Once the first of the L UL codewords has been selected based on the correlation value to the SRS, the remaining L-1 UL codewords can be selected so that all L codewords can be used to form beams that are orthogonal to each other. In addition, the L codewords can be selected so that the sum of their correlation values is at a maximum among all possible combinations of L orthogonal beams.

When selecting these L beams, the BS 604 stores the square root of correlation values corresponding L beams as beam amplitude values. These beam amplitude values can be calculated from one snapshot of SRS, or multiple TTIs of SRS.

In one embodiment, the BS uses two polarizations jointly to select the beam and estimate the amplitudes. In other words, each beam is selected when its correlation to the channels on two BS polarizations is large, and each beam has only one beam weight associated with both polarizations.

In another embodiment, the BS uses two polarizations jointly to select the beam but estimates the beam amplitudes separately for the two polarization directions. In other words, a beam is selected when its correlation to the channels on two BS polarizations is large, while each beam can have 2 different amplitudes when it has different correlation coefficients on the two polarizations.

In another embodiment, the BS selects the beam and estimates the beam amplitudes separately for the two BS polarization directions. In this scenario, each polarization selects L/2 beams according to the SRS on MN TXRUs.

For the DL beam selection/determination, in some embodiments, the beam vectors in the UL beam codebook has one-to-one correspondence to the beam vectors in the composite DL codebook, such that the two beam vectors in correspondence in the UL codebook and the composite DL codebook can steer the beam into a same (elevation, azimuth) direction. Then, the BS selects the L-1 beam vectors such that the corresponding L DL beam vectors are orthogonal to each other, and the sum correlation is the maximum.

In one such embodiment, the composite DL codebook is constructed by the Kronecker product of vertical and horizontal over-sampled DFT codebook, such that:

$$w_v^{DL} = \left\{ \left[ \frac{1}{\sqrt{M}} \exp\left(\frac{j2\pi m k_v}{O_M M}\right) \right]_{m=0,\ldots,M-1} \middle| k_v \in \{0, 1, \ldots, O_M M - 1\} \right\}$$

$$w_h^{DL} = \left\{ \left[ \frac{1}{\sqrt{N}} \exp\left(\frac{j2\pi n k_h}{O_N N}\right) \right]_{n=0,\ldots,N-1} \middle| k_h \in \{0, 1, \ldots, O_N N - 1\} \right\}$$

Where $O_M$ is the vertical oversample rate, $O_N$ is the horizontal oversample rate, and $k_v$ and $k_h$ denote the $k_v$-th vertical codeword and the $k_h$-th horizontal codeword, respectively.

The composite DL codebook is defined such that the ($k_v$, $k_h$)-th codeword is the kronecker product of the $k_v$-th vertical codeword and the $k_h$-th horizontal codeword. The criteria to construct UL codebook is to align the ($k_v$, $k_h$)-th UL codeword to have same elevation and azimuth angle as the ($k_v$, $k_h$)-th DL codeword. The construction can be divided into 2 steps:

STEP 1: finding the corresponding DL elevation and azimuth angle pair of the ($k_v$, $k_h$)-th DL codeword. One non-limiting method for finding the angles is described below.

Consider an M×N omni antenna array, with vertical spacing $d_v$ and horizontal spacing $d_h$, and the beamforming weight pointing to elevation angle $\theta_0$ azimuth angle $\phi_0$, and carrier frequency $\lambda_{DL}$, the vertical and horizontal beamforming weights are:

$$w_v^{\prime DL} = \left[ \frac{1}{\sqrt{M}} \exp\left(-\frac{j2\pi m d_v \cos\theta_{kv}}{\lambda_{DL}}\right) \right]_{m=0,\ldots,M-1}$$

$$w_h^{\prime DL} = \left[ \frac{1}{\sqrt{N}} \exp\left(-\frac{j2\pi n d_h \sin\phi_{kh}\cos\theta_{kv}}{\lambda_{DL}}\right) \right]_{n=0,\ldots,N-1}$$

Comparing to the above over-sample DFT vector definition, it can be observed that all $\theta_{kv}$ (including grating lobes) that maps to the $k_v$-th vertical codeword can be computed as:

$$\theta_{kv} = \cos^{-1}\left( a\frac{\lambda_{DL}}{d_v} - \frac{k_v}{O_M M}\frac{\lambda_{DL}}{d_v} \right),$$

Where a=0, ±1, ±2 . . . Grating lobes will happen when $d_v > 0.5\lambda$.

For each possible $\theta_{kv}$, the corresponding azimuth steering angle $\phi_{kh}$ (including grating lobes) can be computed as:

$$\phi_{kh} = \sin^{-1}\left( b\frac{\lambda_{DL}}{d_h}\frac{1}{\sin\theta_{kh}} - \frac{k_h}{O_N N}\frac{\lambda_{DL}}{d_h}\frac{1}{\sin\theta_{kh}} \right)$$

Where b=0, ±1, ±2 . . .

If one codeword corresponds to multiple pairs of ($\theta_{kv}$, $\phi_{kh}$), compute the array response at all angle pairs considering the element and subarray pattern and choose the angle pair which gives maximum array gain.

In another option, the azimuth steering angle $\phi_{kh}$ can be computed as if the vertical steering angle is at 90 degrees, i.e. $$\phi_{kh} = \sin^{-1}\left( b\frac{\lambda_{DL}}{d_h} - \frac{k_h}{O_N N}\frac{\lambda_{DL}}{d_h} \right),$$

which is a valid approximation when the vertical steering angle is close to 90 degrees, or when the BS antenna's vertical beam width is limited.

STEP 2. calculating the beamforming weight to the same direction at UL frequency.

Once find the corresponding angle pair ($\theta_{kv}$, $\phi_{kh}$) of a DL codeword, the UL codeword can be computed as the kronecker product of $w_v^{\prime UL}$ and $w_h^{\prime UL}$, where:

$$w_v^{\prime UL} = \left[ \frac{1}{\sqrt{M}} \exp\left(-\frac{j2\pi m d_v \cos\theta_{kv}}{\lambda_{UL}}\right) \right]_{m=0,\ldots,M-1}, \text{ and}$$

$$w_h^{\prime UL} = \left[ \frac{1}{\sqrt{N}} \exp\left(-\frac{j2\pi n d_h \sin\phi_{kh}\sin\theta_{kv}}{\lambda_{UL}}\right) \right]_{n=0,\ldots,N-1}$$

In s612 the BS 604 transmits CSI-RS to the UE 602. In some embodiments, the L CSI-RS beam vectors are applied on the TXRU array, and X=2L CSI-RS antenna ports are constructed using L CSI-RS ports. In one such embodiment, a beam vector is used for constructing Tx signals for a pair of CSI-RS ports. In particular, a first CSI-RS port is transmitted in such a way that a first beam vector is applied on MN TXRUs corresponding to a first polarization, and a second CSI-RS port is transmitted in such a way that the first beam vector is applied on MN TXRUs corresponding to a second polarization. A third CSI-RS port is transmitted in such a way that a second beam vector is applied on MN TXRUs corresponding to the first polarization, and a fourth CSI-RS port is transmitted in such a way that the second beam vector is applied on MN TXRUs corresponding to the second polarization.

One particular example of CSI-RS port mapping according to this embodiment is shown in TABLE 4. For this embodiment, a beam is selected according to the correlation maximization described in this invention, wherein a correlation value for individual beam is derived with taking an average of the two correlation values respectively derived with the two SRS channel vectors on the two polarizations of MN TXRUs.

TABLE 4

| CSI-RS port | Selected beam vector index | Polarization | TXRUs |
|---|---|---|---|
| 15 | 1 | First | 1, . . . , MN |
| 16 | 2 | First | MN + 1, . . . , 2MN |
| 17 | 1 | Second | 1, . . . , MN |
| 18 | 2 | Second | MN + 1, . . . , 2MN |

In some embodiments, the L CSI-RS beam vectors are applied on the TXRU array, and X=L CSI-RS antenna ports are constructed using L CSI-RS ports. In one such embodiment, a beam vector is used for constructing Tx signals for one CSI-RS port. In particular, a first CSI-RS port is transmitted in such a way that a first beam vector is applied on MN TXRUs corresponding to a first polarization and a second CSI-RS port is transmitted in such a way that a second beam vector is applied on MN TXRUs corresponding to a second polarization.

One particular example of CSI-RS port mapping according to this embodiment is shown in TABLE 5. For this embodiment, a beam is selected according to the correlation maximization described herein, wherein a correlation value for each individual beam is derived with an SRS channel vector on a polarization of MN TXRUs.

TABLE 5

| CSI-RS port | Selected beam vector index | Polarization | TXRUs |
|---|---|---|---|
| 15 | 1 | First | 1, . . . , MN |
| 16 | 2 | First | MN + 1, . . . , 2MN |
| 17 | 3 | Second | 1, . . . , MN |
| 18 | 4 | Second | MN + 1, . . . , 2MN |

In s614, the UE 602 derives CSI information and provides CSI feedback in s616. The BS configures subband CSI report (e.g., PUSCH mode 3-1 or 3-2) and receives subband PMI, CQI and RI. The subband PMI can be one-to-one mapped to a precoding vector. For example, if 4-port CSI-RS is configured for UE, the reported subband PMI corresponds to a 4×1 vector comprising four complex values, if the UE reports RI value 1.

After s616, the BS memory now contains the following information for each UE to be MU-MIMO scheduled:

L beam weight vector $b_\ell, \ell=1, \ldots, L$—obtained using SRS, a wideband property;

L amplitude values $a_\ell$—obtained using SRS, a wideband property; and

X pairs of complex numbers $c_{x,SB}$ . . . corresponding to subband PMI feedback, a subband property.

Utilizing this information, at s618 the BS re-constructs the DL channel matrix per subband on a set of TXRUs corresponding to CSI-RS port index x, (x=1, . . . 2X), $h_{SB,x}$ for each UE according to the following:

$$h_{SB,x} = \sum_{\ell=1}^{L} a_\ell \begin{bmatrix} b_\ell & 0 \\ 0 & b_\ell \end{bmatrix} \begin{bmatrix} c_{x1,SB} \\ c_{x2,SB} \end{bmatrix}.$$

It is noted that examples of mapping TXRUs to CSI-RS ports can be found in TABLE 4 and TABLE 5.

In the embodiment that amplitudes are obtained separately for the two polarizations, each beam has two amplitudes corresponding to two polarizations, $a_{\ell 1}$ and $a_{\ell 2}$. The DL channel can be reconstructed as:

$$h_{SB,x} = \sum_{\ell=1}^{L} \begin{bmatrix} b_\ell & 0 \\ 0 & b_\ell \end{bmatrix} \begin{bmatrix} a_{\ell 1} c_{x1,SB} \\ a_{\ell 2} c_{x2,SB} \end{bmatrix}.$$

In the embodiment that the beams and amplitudes are both derived separately on different polarizations, the DL channel can be constructed as:

$$h_{SB,x} = \sum_{\ell=1}^{L} \begin{bmatrix} b_{\ell 1} & 0 \\ 0 & b_{\ell 2} \end{bmatrix} \begin{bmatrix} a_{\ell 1} c_{x1,SB} \\ a_{\ell 2} c_{x2,SB} \end{bmatrix}.$$

Figure 9:
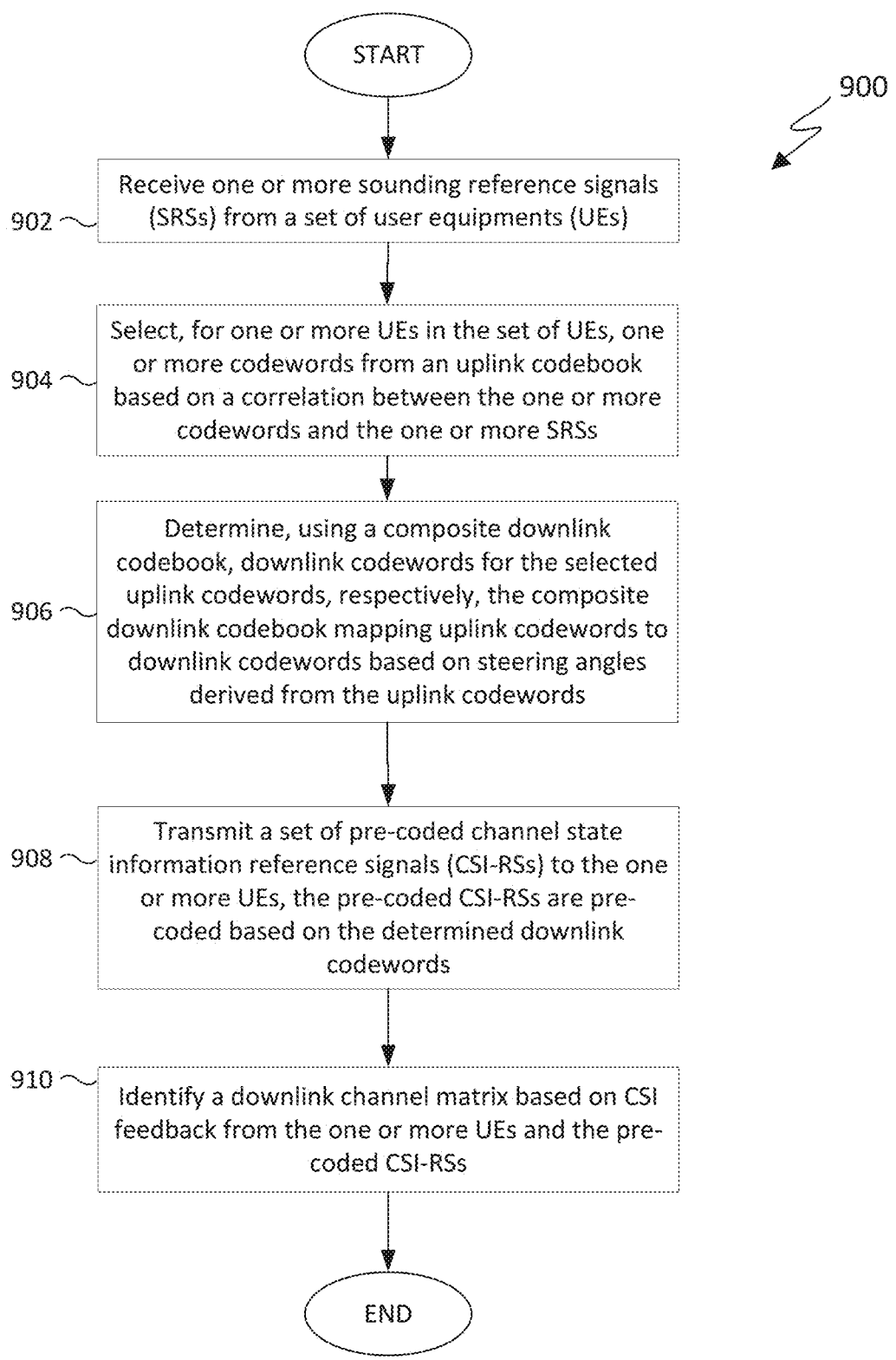
FIG. 9 illustrates a flowchart of a process for generating multi-user precoders based on partial reciprocity according to various embodiments of this disclosure.

FIG. 9 illustrates a flowchart of a process for generating multi-user precoders based on partial reciprocity according to various embodiments of this disclosure. Operations of flowchart 900 can be implemented in a base station, such as base station 200 in FIG. 2.

Flowchart 900 begins in operation 902 by receiving one or more sounding reference signals (SRSs) from a set of user equipments (UEs). The set of UEs can be a single user equipment or two or more UEs.

In operation 904, for one or more UEs in the set of UEs, one or more codewords is selected from an uplink codebook based on a correlation between the one or more codewords and the one or more SRSs. In some embodiments disclosed herein, only one uplink codeword is selected for each of the set of UEs in the set of UEs. In other embodiments, more than one uplink codeword is selected for each of the set of UEs in the set of UEs.

In operation 906, DL codewords are determined for the selected uplink codewords using a composite DL codebook mapping uplink codewords to downlink codewords based on steering angles derived from the uplink codewords.

In a non-limiting embodiment, determining the downlink codewords using the composite codebook can include determining steering angles from the selected uplink codewords in the uplink codebook; determining corresponding downlink codewords the uplink codewords, respectively, using one of the steering angles; and generating the composite codebook. The steering angle can be a one-dimensional or two-dimension angle.

In a non-limiting embodiment, determining the steering angles can include determining, for an uplink codeword having two or more steering angles, an array gain for each of the two or more steering angles; and selecting the steering angle with the highest gain as the determined steering angle for the codeword having the two or more steering angles.

In operation 908, a set of precoded channel state information reference signals (CSI-RS) are transmitted to the one or more UEs in the set of UEs. CSI-RS are precoded based on the partial channel knowledge that is available at the BS side. The precoded CSI-RSs are pre-coded based on the determined downlink codewords to establish directivity of the associated beams.

In operation 910, a downlink channel matrix is identified based on the CSI feedback from the one or more UEs in the set of UEs and the precoded CSI-RSs.

Although this disclosure has been described with an exemplary embodiment, various changes and modifications may be suggested to one skilled in the art. It is intended that this disclosure encompass such changes and modifications as fall within the scope of the appended claims. None of the description in this application should be read as implying that any particular element, step, or function is an essential element that must be included in the claims scope. The scope of patented subject matter is defined only by the claims.

What is claimed is:

1. A base station for generating multi-user precoders, the base station comprising:
   a transceiver configured to receive one or more sounding reference signals (SRSs) from a set of user equipments (UEs); and
   a processor operably connected to the transceiver, the processor configured to:
      select, for one or more UEs in the set of UEs, one or more codewords from an uplink codebook based on a correlation between the one or more codewords and the one or more SRSs;
      determine, using a composite downlink codebook, downlink codewords for the selected uplink codewords, respectively, the composite downlink codebook mapping uplink codewords to downlink codewords;
      transmit a set of pre-coded channel state information reference signals (CSI-RSs) to the one or more UEs, wherein the set of pre-coded CSI-RSs are pre-coded based on the determined downlink codewords; and
      identify a downlink channel matrix based on CSI feedback from the one or more UEs and the set of pre-coded CSI-RSs.

2. The base station of claim 1, wherein to determine the downlink codewords using the composite downlink codebook, the processor is further configured to:
   determine steering angles from the selected uplink codewords in the uplink codebook;
   determine corresponding downlink codewords from the uplink codewords using the determined steering angles; and
   generate the composite downlink codebook.

3. The base station of claim 2, wherein to determine the steering angles, the processor is further configured to:
   determine, for an uplink codeword having two or more aliasing steering angles, an array gain for each of the two or more aliasing steering angles; and
   select the steering angle with the highest gain as the determined steering angle for the uplink codeword having the two or more aliasing steering angles.

4. The base station of claim 1, wherein the processor is further configured to:
   identify, from a secondary codebook that is larger than the uplink codebook, uplink codewords most frequently used by the set of UEs; and
   update the composite downlink codebook with a subset of uplink codewords from the secondary codebook, wherein the subset of uplink codewords are most frequently used by the set of UEs.

5. The base station of claim 1, wherein when the one or more codewords is two or more codewords, to select the one or more codewords, the processor is further configured to:
   select a first uplink codeword of the one or more codewords which has the strongest correlation value based on the one or more SRSs; and
   select remaining uplink codewords in the one or more codewords, wherein the remaining uplink codewords define beams that are orthogonal to the selected first uplink codeword.

6. The base station of claim 5, wherein:
   the base station is configured to transmit beams with two different polarization directions,
   uplink codewords in the one or more codewords are selected based on a joint correlation for both of the two different polarization directions relative to the one or more SRSs, and
   to identify the downlink channel matrix, the processor is further configured to:
      determine a linear combination of DL beam weight vectors using wideband amplitude values, wideband beam weight vectors, and subband co-phase values,
      wherein the wideband amplitude values for each of the beams associated with the one or more codewords are estimated jointly for the two different polarization directions using the one or more SRSs, and
      wherein the subband co-phase values are obtained via feedback.

7. The base station of claim 5, wherein:
   the base station is configured to transmit beams with two different polarization directions,
   uplink codewords in the one or more codewords are selected based on either a joint correlation for both of the two different polarization directions relative to the one or more SRSs, or separately selected based on individual correlation for each of the two different polarization directions relative to the one or more SRSs, and
   to identify the downlink channel matrix, the processor is further configured to:
      determine a linear combination of DL beam weight vectors using wideband amplitude values, wideband beam weight vectors, and subband co-phase values,
      wherein the wideband amplitude values for each of the beams associated with the one or more codewords are estimated separately for the two different polarization directions.

8. A method of a base station for generating multi-user precoders, the method comprising:
   receiving one or more sounding reference signals (SRSs) from a set of user equipments (UEs);
   selecting, for one or more UEs in the set of UEs, one or more codewords from an uplink codebook based on a correlation between the one or more codewords and the one or more SRSs;
   determining, using a composite downlink codebook, downlink codewords for the selected uplink codewords, respectively, the composite downlink codebook mapping uplink codewords to downlink codewords;
   transmitting a set of pre-coded channel state information reference signals (CSI-RSs) to the one or more UEs, wherein the set of pre-coded CSI-RSs are pre-coded based on the determined downlink codewords; and
   identifying a downlink channel matrix based on CSI feedback from the one or more UEs and the set of pre-coded CSI-RSs.

9. The method of claim 8, wherein determining the downlink codewords using the composite downlink codebook further comprises:
determining steering angles from the selected uplink codewords in the uplink codebook;
determining corresponding downlink codewords from the uplink codewords using the determined steering angles; and
generating the composite downlink codebook.

10. The method of claim 9, wherein determining the steering angles further comprises:
determining, for an uplink codeword having two or more aliasing steering angles, an array gain for each of the two or more aliasing steering angles; and
selecting the steering angle with the highest gain as the determined steering angle for the uplink codeword having the two or more aliasing steering angles.

11. The method of claim 8, further comprising:
identifying, from a secondary codebook that is larger than the uplink codebook, uplink codewords most frequently used by the set of UEs; and
updating the composite downlink codebook with a subset of uplink codewords from the secondary codebook, wherein the subset of uplink codewords are most frequently used by the set of UEs.

12. The method of claim 8, wherein:
the one or more codewords is two or more codewords, and selecting the one or more codewords further comprises:
selecting a first uplink codeword of the one or more codewords which has the strongest correlation value based on the one or more SRSs; and
selecting remaining uplink codewords in the one or more codewords, wherein the remaining uplink codewords define beams that are orthogonal to the selected first uplink codeword.

13. The method of claim 12, wherein:
the base station is configured to transmit beams with two different polarization directions,
uplink codewords in the one or more codewords are selected based on a joint correlation for both of the two different polarization directions relative to the one or more SRSs, and
identifying the downlink channel matrix further comprises:
determining a linear combination of DL beam weight vectors using wideband amplitude values, wideband beam weight vectors, and subband co-phase values,
wherein the wideband amplitude values for each of the beams associated with the one or more codewords are estimated jointly for the two different polarization directions using the one or more SRSs, and wherein the subband co-phase values are obtained via feedback.

14. The method of claim 12, wherein:
the base station is configured to transmit beams with two different polarization directions,
uplink codewords in the one or more codewords are selected based on either a joint correlation for both of the two different polarization directions relative to the one or more SRSs, or separately selected based on an individual correlation for each of the two different polarization directions relative to the one or more SRSs,
identifying the downlink channel matrix further comprises determining a linear combination of DL beam weight vectors using wideband amplitude values, wideband beam weight vectors, and subband co-phase values,
wherein the wideband amplitude values for each of the beams associated with the one or more codewords are estimated separately for the two different polarization directions.

15. A non-transitory, computer-readable medium storing instructions that, when executed by a processor of a base station, cause the base station to:
receive one or more sounding reference signals (SRSs) from a set of user equipments (UEs);
select, for one or more UEs in the set of UEs, one or more codewords from an uplink codebook based on a correlation between the one or more codewords and the one or more SRSs;
determine, using a composite downlink codebook, downlink codewords for the selected uplink codewords, respectively, the composite downlink codebook mapping uplink codewords to downlink codewords;
transmit a set of pre-coded channel state information reference signals (CSI-RSs) to the one or more UEs, wherein the set of pre-coded CSI-RSs are pre-coded based on the determined downlink codewords; and
identify a downlink channel matrix based on CSI feedback from the one or more UEs and the set of pre-coded CSI-RSs.

16. The non-transitory, computer-readable medium of claim 15, wherein instructions for determining the downlink codewords using the composite downlink codebook further comprises instructions that, when executed by the processor of the base station, cause the base station to:
determine steering angles from the selected uplink codewords in the uplink codebook;
determine corresponding downlink codewords from the uplink codewords using the determined steering angles; and
generate the composite downlink codebook.

17. The non-transitory, computer-readable medium of claim 16, wherein instructions for determining the steering angles further comprises instructions that, when executed by the processor of the base station, cause the base station to:
determine, for an uplink codeword having two or more aliasing steering angles, an array gain for each of the two or more aliasing steering angles; and
select the steering angle with the highest gain as the determined steering angle for the uplink codeword having the two or more aliasing steering angles.

18. The non-transitory, computer-readable medium of claim 15, wherein the one or more codewords is two or more codewords, and wherein instructions for selecting the one or more codewords comprises further instructions that, when executed by a processor of a base station, cause the base station to:
select a first uplink codeword of the one or more codewords which has the strongest correlation value based on the one or more SRSs; and
select remaining uplink codewords in the one or more codewords, wherein the remaining uplink codewords define beams that are orthogonal to the selected first uplink codeword.

19. The non-transitory, computer-readable medium of claim 18, wherein:
the base station is configured to transmit beams with two different polarization directions, uplink codewords in the one or more codewords are selected based on a joint correlation for both of the two different polarization directions relative to the one or more SRSs, and instructions for identifying the downlink channel matrix comprises further instructions to cause the base station to:

determine a linear combination of DL beam weight vectors using wideband amplitude values, wideband beam weight vectors, and subband co-phase values, wherein the wideband amplitude values for each of the beams associated with the one or more codewords are estimated jointly for the two different polarization directions using the one or more SRSs, and wherein the subband co-phase values are obtained via feedback.

20. The non-transitory, computer-readable medium of claim 18, wherein:

the base station is configured to transmit beams with two different polarization directions, uplink codewords in one or more codewords are selected based on either a joint correlation for both of the two different polarization directions relative to the one or more SRSs, or separately selected based on individual correlation for each of the two different polarization directions relative to the one or more SRSs, and instructions for identifying the downlink channel matrix comprises further instructions to cause the base station to:

determine a linear combination of DL beam weight vectors using wideband amplitude values, wideband beam weight vectors, and subband co-phase values, wherein the wideband amplitude values for each of the beams associated with the one or more codewords are estimated separately for the two different polarization directions.

* * * * *